United States Patent
Asanuma (10) Patent No.: US 10,526,985 B2
(45) Date of Patent: Jan. 7, 2020

(54) EVAPORATED FUEL PROCESSING DEVICE

(71) Applicant: AISAN KOGYO KABUSHIKI KAISHA, Obu-shi, Aichi (JP)

(72) Inventor: Daisaku Asanuma, Obu (JP)

(73) Assignee: AISAN KOGYO KABUSHIKI KAISHA, Obu-Shi, Aichi (JP)

( * ) Notice: Subject to any disclaimer, the term of this patent is extended or adjusted under 35 U.S.C. 154(b) by 0 days.

(21) Appl. No.: 16/301,487

(22) PCT Filed: Feb. 27, 2017

(86) PCT No.: PCT/JP2017/007412
§ 371 (c)(1),
(2) Date: Nov. 14, 2018

(87) PCT Pub. No.: WO2017/208538
PCT Pub. Date: Dec. 7, 2017

(65) Prior Publication Data
US 2019/0285011 A1    Sep. 19, 2019

(30) Foreign Application Priority Data

May 30, 2016 (JP) ................. 2016-107577

(51) Int. Cl.
*F02M 1/00* (2006.01)
*F02D 41/00* (2006.01)
(Continued)

(52) U.S. Cl.
CPC .... *F02D 41/0045* (2013.01); *B60K 15/03504* (2013.01); *F02M 25/089* (2013.01); *F02M 25/0836* (2013.01); *B60K 2015/03514* (2013.01)

(58) Field of Classification Search
CPC ............ F02D 2250/02; F02D 19/0621; F02D 41/003; F02D 41/0032; F02D 41/004; F02D 41/0042; F02M 25/08; F02M 25/0836

(Continued)

(56) References Cited

U.S. PATENT DOCUMENTS

| 5,606,955 A | 3/1997 | Yuda |
| 5,735,251 A | 4/1998 | Hyodo et al. |

(Continued)

FOREIGN PATENT DOCUMENTS

| JP | H06-101534 A | 4/1994 |
| JP | H08-074682 A | 3/1996 |

(Continued)

OTHER PUBLICATIONS

English Translation of the International Search Report (ISR) for PCT/JP2017/007412 dated Apr. 25, 2017 (2 pages).

(Continued)

*Primary Examiner* — John Kwon
(74) *Attorney, Agent, or Firm* — Shumaker, Loop & Kendrick, LLP (57) ABSTRACT

An evaporated fuel processing device may include: a canister; a purge passage through which purge gas sent from the canister to an intake passage passes; a pump; a control valve disposed on the purge passage and configured to switch between a communication state and a cutoff state; a specifying device configured to specify an evaporated fuel concentration of the purge gas in the purge passage when the purge gas is to be supplied from the canister to the intake passage. A controller may be configured to switch the control valve based on at least a first cycle and a second cycle which is longer than the first cycle. The specifying device may specify the evaporated fuel concentration of the purge gas in the purge passage while the pump is active and the control valve is in the cutoff state in the second cycle.

8 Claims, 7 Drawing Sheets

(51) Int. Cl.
*B60K 15/035* (2006.01)
*F02M 25/08* (2006.01)

(58) Field of Classification Search
USPC .................................. 123/516, 518, 519, 520
See application file for complete search history.

(56) References Cited

U.S. PATENT DOCUMENTS

| | | |
|---|---|---|
| 7,246,608 B2 | 7/2007 | Kano et al. |
| 7,409,947 B2 | 8/2008 | Koyama |
| 2002/0161495 A1* | 10/2002 | Yamaki ................. G01M 15/05 |
| | | 701/33.8 |
| 2019/0145354 A1* | 5/2019 | Kato ...................... F02M 25/08 |
| 2019/0203666 A1* | 7/2019 | Asanuma ............... F02M 25/08 |
| 2019/0242315 A1* | 8/2019 | Watanabe ........... F02D 41/0032 |
| 2019/0242331 A1* | 8/2019 | Kato ................ B60K 15/03504 |
| 2019/0271284 A1* | 9/2019 | Sugiura .............. F02M 25/0818 |

FOREIGN PATENT DOCUMENTS

| | | |
|---|---|---|
| JP | H09-303216 A | 11/1997 |
| JP | 2006-161690 A | 6/2006 |
| JP | 2007-170221 A | 7/2007 |
| JP | 2007-198267 A | 8/2007 |
| JP | 2007-218229 A | 8/2007 |

OTHER PUBLICATIONS

Written Opinion of the International Searching Authority of PCT International App. No. PCT/JP2017/007412 dated Apr. 25, 2017 with English Translation (7 pages).

\* cited by examiner

EVAPORATED FUEL PROCESSING DEVICE

TECHNICAL FIELD

The description herein discloses a technique related to an evaporated fuel processing device. Especially, it discloses an evaporated fuel processing device configured to purge evaporated fuel generated in a fuel tank to an intake passage and process the same.

BACKGROUND ART

Japanese Patent Application Publication No. H6-101534 A describes an evaporated fuel processing device. This evaporated fuel processing device includes a sensor configured to specify a fluid density of air introduced to a canister and a sensor configured to specify a fluid density of a gas mixture of evaporated fuel and air (which is hereinbelow termed "purge gas") sent from the canister to an engine. The sensor for specifying the fluid density of the purge gas is disposed between the canister and an intake passage to the engine. A control valve configured to control supply of the purge gas to the intake passage is disposed between the canister and the intake passage. The evaporated fuel processing device uses the fluid density of air and the fluid density of the purge gas specified respectively by the two sensors while the purge gas is being supplied to the intake passage from the canister to calculate a concentration of the purge gas based on a ratio or a difference of those fluid densities.

SUMMARY

Technical Problem

In a configuration in which a supply amount of purge gas is controlled by a control valve being switched between being opened and closed based on a duty control while the purge gas is being supplied to an intake passage from a canister, communication between the intake passage and the canister is cut off when the control valve is closed. Due to this, a pressure of the purge gas between the canister and the intake passage changes according to opening and closing of the control valve. When the pressure of the purge gas between the canister and the intake passage changes, it is difficult to specify a concentration of the purge gas by using characteristics of the purge gas. The description herein provides a technique that enables to specify a concentration of purge gas while the purge gas is supplied to an engine from a canister.

Solution to Technical Problem

An evaporated fuel processing device disclosed herein may be mounted on a vehicle. The evaporated fuel processing device may comprise a canister configured to adsorb evaporated fuel in a fuel tank; a purge passage connected between an intake passage for an engine and the canister, and through Which purge gas sent from the canister to the intake passage passes; a pump disposed on the purge passage between the canister and the intake passage, and configured to send the purge gas from the canister to the intake passage; a control valve disposed on the purge passage and configured to switch between a communication state and a cutoff state, the communication state being a state where the canister and the intake passage communicate through the purge passage, and the cutoff state being a state where the canister and the intake passage are not communicated on the purge passage; a controller configured to execute duty control to switch the control valve between the communication state and the cutoff state based on a duty ratio in a case where the purge gas is to be supplied from the canister to the intake passage; and a specifying device configured to specify an evaporated fuel concentration of the purge gas in the purge passage. The controller may switch the control valve based on plural kinds of cycles in the duty control. The plural kinds of cycles may include a first cycle and a second cycle which is longer than the first cycle. The specifying device may specify the evaporated fuel concentration of the purge gas in the purge passage while the pump is active and the control valve is in the cutoff state in the second cycle during the duty control.

In this configuration, in a case where the control valve is set to the cutoff state while the pump is active, the purge gas fed out from the canister flows in the purge passage. During when the control valve is duty-controlled and the pump is operating, that is, during when a purge process for sending the purge gas from the canister to the intake passage is being executed, the purge gas is sent from the canister to the engine at a timing when the control valve is in the communication state, and the purge gas is sent from the canister to the purge passage at a timing when the control valve is in the cutoff state. The specifying device is configured to specify an evaporated fuel concentration of the purge gas flowing in the purge passage during the purge process.

However, when a period of the cutoff state of the control valve is short, a pressure of the purge gas does not stabilize, and there is a case where it is difficult to appropriately detect the evaporated fuel concentration. In the above configuration, if the control valve is being controlled by a constant duty ratio, the period in which the control valve is in the cutoff state becomes longer in the second cycle than in the first cycle. Due to this, in the second cycle, the evaporated fuel concentration of the purge gas may be specified over a relatively long period of time. According to this configuration, the specifying device may specify the evaporated fuel concentration of the purge gas in the purge passage after the pressure of the purge gas has stabilized during the second cycle.

A maximum ratio of a period of the communication state in the second cycle may be less than a maximum ratio of a period of the communication state in the first cycle. When the maximum ratio of the period of the communication state in the duty ratio is set small, the period of the cutoff state, that is, the period for specifying the evaporated fuel concentration may be suppressed from becoming short.

The controller may be configured to switch the control valve in the second cycle that takes place for one time after the first cycle takes place for a predetermined number of times consecutively, the predetermined number being two or more. According to this configuration, the concentration may be specified each time the first cycle takes place for the predetermined number of times.

The controller may be configured to change the predetermined number of times for the first cycle according to the evaporated fuel concentration. According to this configuration, a frequency of a concentration detection may be changed according to the evaporated fuel concentration.

The controller may be configured to change a rotary speed of the pump according to the evaporated fuel concentration while the control valve is controlled in the second cycle. A flow rate of the purge gas flowing in the purge passage may be adjusted by changing the rotary speed of the pump. Due to this, in a case where the concentration should be detected at an early point of time, the rotary speed of the pump may be increased to quickly send the purge gas to the specifying device.

The specifying device may comprise a narrowed portion disposed on the purge passage and having a flow passage area smaller than a flow passage area of the purge passage; and a pressure detecting unit configured to detect a pressure of the purge gas flowing in the narrowed portion. The specifying device may be configured to specify the evaporated fuel concentration using the pressure detected by the pressure detecting unit. According to this configuration, the evaporated fuel concentration may be specified after the pressure of the purge gas has stabilized, by using this pressure.

The purge passage may comprise a return flow passage, one end of the return flow passage is connected to the purge passage between the pump and the control valve, another end of the return flow passage is connected to the purge passage on an upstream side relative to the pump. The purge gas may enter the return flow passage from the one end and flows toward the other end of the return flow passage in a case where the control valve is in the cutoff state and the pump is active. The specifying device may be disposed on the return flow passage and may be configured to specify the evaporated fuel concentration of the purge gas within the return flow passage while the pump is active and the control valve is in the cutoff state in the second cycle during the duty control. When the specifying device is disposed on a passage through which the purge gas flows from the canister toward the intake passage, the specifying device becomes a resistance therein, and a pressure loss is generated in the purge gas. According to this configuration, the specifying device does not have to be disposed on the passage for the purge gas supplied from the canister to the intake passage. Due to this, when the purge gas is supplied from the canister to the intake passage, a situation in which the pressure loss is generated in the purge gas due to the specifying device may be avoided.

The specifying device may comprise a pressure detecting unit configured to detect a pressure in the purge passage, and the specifying device may be configured to specify the evaporated fuel concentration using the pressure in the purge passage detected by the pressure detecting unit. According to this configuration, the evaporated fuel concentration may be specified using the pressure in the purge passage without disposing a configuration, such as a narrowed portion, that hinders a flow of the purge gas on the purge passage.

DESCRIPTION OF EMBODIMENTS (First Embodiment)

Figure 1:
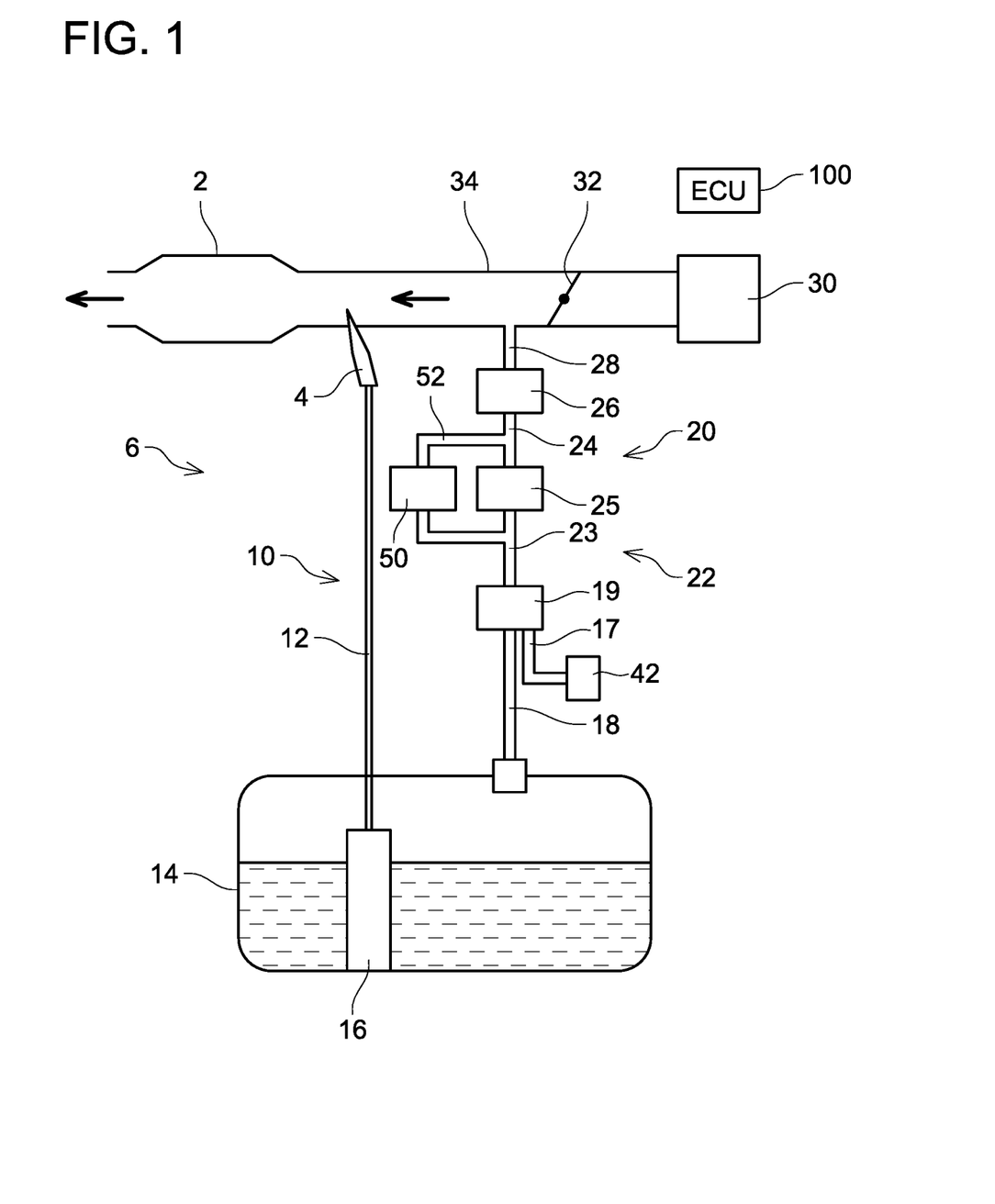
FIG. 1 shows an overview of a fuel supply system of a vehicle according to an embodiment.

A fuel supply system 6 provided with an evaporated fuel processing device 20 will be described with reference to FIG. 1. The fuel supply system 6 is provided with a main supply passage 10 for supplying fuel stored in a fuel tank 14 to an engine 2 and a purge passage 22 for supplying evaporated fuel generated in the fuel tank 14 to the engine 2.

The main supply passage 10 is provided with a fuel pump unit 16, a supply passage 12, and an injector 4. The fuel pump unit 16 is provided with a fuel pump, a pressure regulator, a control circuit, and the like. The fuel pump unit 16 controls the fuel pump according to a signal supplied from an ECU 100. The fuel pump boosts pressure of the fuel in the fuel tank 14 and discharges the same. The pressure of the fuel discharged from the fuel pump is regulated by the pressure regulator, and the fuel is supplied from the fuel pump unit 16 to the supply passage 12. The supply passage 12 is connected to the fuel pump unit 16 and the injector 4. The fuel supplied to the supply passage 12 passes through the supply passage 12 and reaches the injector 4. The injector 4 includes a valve (not shown) of which aperture is controlled by the ECU 100. When the valve of the injector 4 is opened, the fuel in the supply passage 12 is supplied to an intake passage 34 connected to the engine 2.

The intake passage 34 is connected to an air cleaner 30. The air cleaner 30 is provided with a filter that removes foreign particles in air that flows into the intake passage 34. A throttle valve 32 is provided in the intake passage 34 between the engine 2 and the air cleaner 30. When the throttle valve 32 opens, air is suctioned from the air cleaner 30 toward the engine 2 as shown by an arrow in the intake passage 34 in FIG. 1. The throttle valve 32 adjusts an aperture of the intake passage 34 and adjusts a quantity of air flowing into the engine 2. The throttle valve 32 is provided on an upstream side (air cleaner 30 side) than the injector 4.

The purge supply passage 22 is disposed parallel to the main supply passage 10. The purge supply passage 22 is a passage through which a gas mixture of evaporated fuel from a canister 19 and air (which is termed "purge gas" hereinbelow) passes when it flows from the canister 19 to the intake passage 34. The purge supply passage 22 is provided with the evaporated fuel processing device 20. The evaporated fuel processing device 20 is provided with the canister 19, purge passages 23, 24, 28, a control valve 26, a return flow passage 52, and a concentration detector 50.

The fuel tank 14 and the canister 19 are connected by a communicating passage 18. The canister 19 is connected to the intake passage 34 via the purge passages 23, 24, 28.

Figure 2:
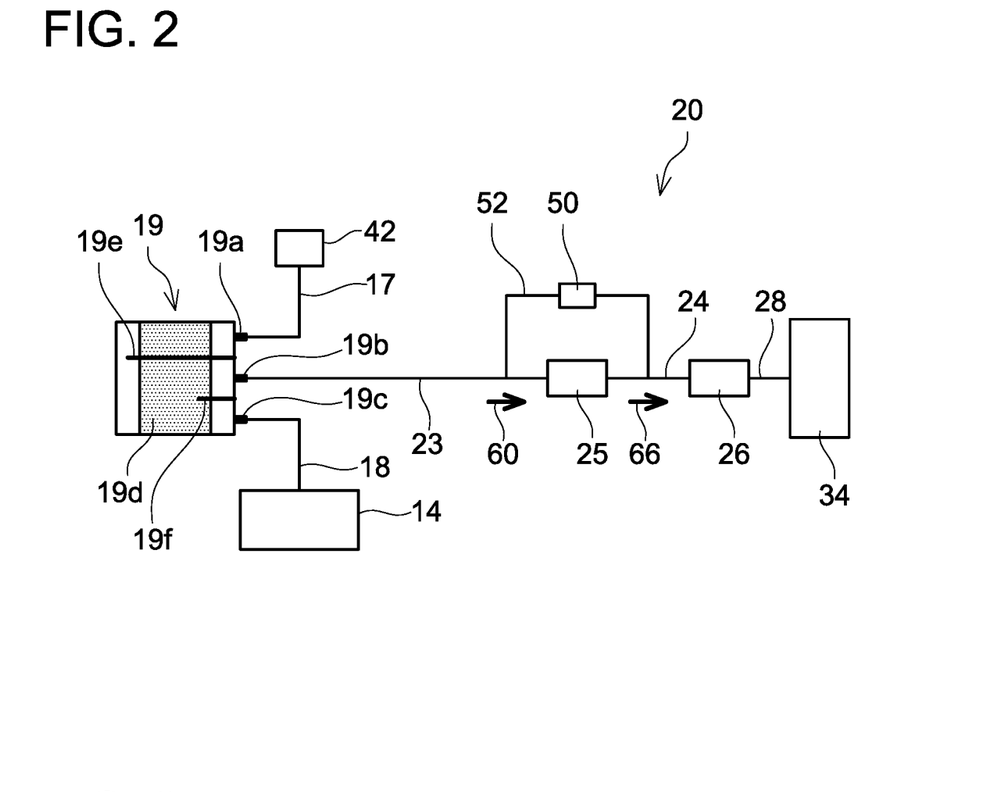
FIG. 2 shows an evaporated fuel processing device according to a first embodiment.

As shown in FIG. 2, the canister 19 is provided with an air port 19a, a purge port 19b, and a tank port 19c. The air port 19a is connected to an air filter 42 via a communicating passage 17. Air may flow into the canister 19 from the air port 19a through the communicating passage 17 after having passed through the air filter 42. When this happens, the air filter 42 prevents foreign particles in the air from entering the canister 19.

The purge port 19b is connected to the purge passage 23. The tank port 19c is connected to the fuel tank 14 via the communicating passage 18. The canister 19 accommodates activated charcoal 19d. The ports 19a, 19b, and 19c are provided on one wall surface, among wall surfaces of the canister 19, that faces the activated charcoal 19d. A space exists between the activated charcoal 19d and the inner wall of the canister 19 on which the ports 19a, 19b, and 19c are provided. A first partition wall 19e and a second partition wall 19f are fixed to the inner wall of the canister 19 on a side where the ports 19a, 19b, and 19c are provided. The first partition wall 19e separates the space between the activated charcoal 19d and the inner wall of the canister 19 in a range between the air port 19a and the purge port 19b. The first partition wall 19e extends to a space on an opposite side from the side where the ports 19a, 19b, and 19c are provided. The second partition wall 19f separates the space between the activated charcoal 19d and the inner wall of the canister 19 in a range between the purge port 19b and the tank port 19c.

The activated charcoal 19d adsorbs evaporated fuel from a gas flowing into the canister 19 from the fuel tank 14 through the communicating passage 18 and the tank port 19c. The gas after the evaporated fuel has been adsorbed is discharged to open air through the air port 19a. The canister 19 can prevent the evaporated fuel in the fuel tank 14 from being discharged to open air. The evaporated fuel adsorbed by the activated charcoal 19d is supplied to the purge passage 23 from the purge port 19b. The first partition plate 19e separates the space where the air port 19a is connected and the space where the purge port 19b is connected. The first partition plate 19e prevents the gas containing the evaporated fuel from being discharged to open air. The second partition plate 19f separates the space where the purge port 19b is connected and the space where the tank port 19c is connected. The second partition plate 19f prevents the gas flowing into the canister 19 from the tank port 19c from directly flowing to the purge passage 23.

The purge passages 23, 24, 28 connect the canister 19 and the intake passage 34. A pump 25 is provided between the purge passage 23 and the purge passage 24. The control valve 26 is disposed at an end of the purge passage 24 on an opposite side from the pump 25. The pump 25 is disposed between the canister 19 and the control valve 26, and is configured to pump the purge gas to the intake passage 34. Specifically, the pump 25 suctions the purge gas in the canister 19 through the purge passage 23 in a direction of an arrow 60, and pushes out the purge gas through the purge passage 24 toward the intake passage 34 in a direction of an arrow 66. When the engine 2 is running, the intake passage 34 has a negative pressure. Due to this, the evaporated fuel adsorbed in the canister 19 can be introduced to the intake passage 34 by a pressure difference between the intake passage 34 and the canister 19. However, by disposing the pump 25 on the purge passages 23, 24, the evaporated fuel adsorbed in the canister 19 can be supplied to the intake passage 34 even when a pressure in the intake passage 34 is at a pressure that is not sufficient to suction the purge gas (a positive pressure during a supercharged state by a supercharger (not shown) or a negative pressure of which absolute value is small). Further, by disposing the pump 25, a desired quantity of the evaporated fuel can be supplied to the intake passage 34.

The control valve 26 is disposed between the purge passage 24 and the purge passage 28. The control valve 26 is a solenoid valve controlled by the ECU 100. More specifically, the control valve 26 is switched between an open state and a closed state by power according to a duty ratio decided by the ECU 100 being supplied thereto (that is, by being controlled on duty basis). A communication state in which the canister 19 and the intake passage 34 are communicated via the purge passages 23, 24, 28 by the control valve 26 being opened and a cutoff state in which the canister 19 and the intake passage 34 is not communicated on the purge passages 23, 24, 28 by the control valve 26 being closed are switched. When the control valve 26 is controlled on the duty basis, the control valve 26 repeats being in the cutoff state and in the communication state cyclically. This state is called a purge state. That is, in the purge state, the state in which the canister 19 and the intake passage 34 are communicated does not continue, but the state in which the canister 19 and the intake passage 34 are communicated by the control valve 26 being opened and the state in which communication between the canister 19 and the intake passage 34 is cut off by the control valve 26 being closed are switched cyclically. Due to this, a supply quantity of the purge gas is controlled. In the duty-based control, a known method is used by the ECU 100 to decide the duty ratio based on a concentration of evaporated fuel in the purge gas (which will be termed "purge concentration" hereinbelow), a purge gas flow rate, and an air-fuel ratio of the engine 2.

An upstream end of the return flow passage 52 is connected to the purge passage 24 between the pump 25 and the control valve 26. A downstream end of the return flow passage 52 is connected to the purge passage 23 between the canister 19 and the pump 25. As a result, the purge gas flows from the purge passage 24 to the return flow passage 52 and further flows to the purge passage 23 when the control valve 26 is closed and the pump 25 is active.

Figure 3:
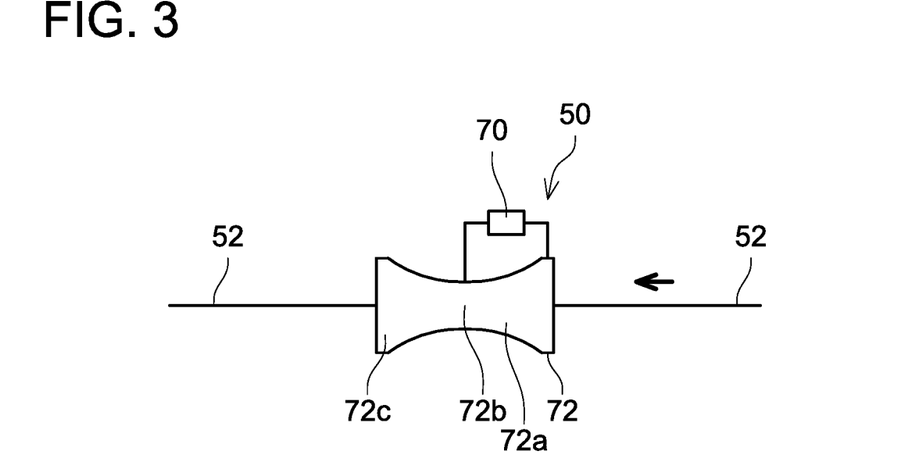
FIG. 3 shows a configuration of a concentration sensor according to the first embodiment.

The concentration detector 50 is disposed at an intermediate position on the return flow passage 52. On the other hand, no concentration sensor is disposed on the purge passages 23, 24, 28. As shown in FIG. 3, the concentration detector 50 is provided with a venturi passage 72 and a differential pressure sensor 70. One end 72a of the venturi passage 72 is connected to an upstream side of the return flow passage 52. Another end 72c of the venturi passage 72 is connected to a downstream side of the return flow passage 52. The differential pressure sensor 70 is connected between the end 72a and a center portion (throttling portion) 72b of the venturi passage 72. The concentration detector 50 uses the differential pressure sensor 70 capable of specifying a pressure difference between the end 72a and the center portion 72b to specify the pressure difference between the end 72a and the center portion 72b. By specifying the pressure difference between the end 72a and the center portion 72b, a density of the purge gas (purge concentration) can be calculated (that is, specified) by a Bernoulli formula.

Various types of sensors may be used in the concentration detector 50. For example, the differential pressure sensor 70 may be provided with an orifice passage provided with an orifice plate instead of the venturi passage 72. The concentration detector 50 may specify a pressure difference between upstream and downstream sides of the orifice plate using the differential pressure sensor 70 to specify the purge concentration. Alternatively, for example, the differential pressure sensor 70 may be provided with a capillary passage viscometer instead of the venturi passage 72. The capillary passage viscometer may have a plurality of capillary passages disposed therein. A pressure difference between upstream and downstream sides of the capillary passages may be specified by using the differential pressure sensor 70, and viscosity of the purge gas passing through the capillary passage viscometer may be measured. Due to this, the viscosity of the purge gas can be calculated by a Hagen-Poiseuille formula. The viscosity of the purge gas has a correlated relationship with the purge concentration, so the purge concentration can be specified by calculating the viscosity of the purge gas.

Further, the concentration detector 50 may be provided with a pressure sensor configured to specify a pressure on an upstream side or a downstream side of the venturi passage 72 instead of the differential pressure sensor 70.

The ECU 100 includes a CPU and a memory such as a ROM and a RAM. The ECU 100 is connected to the injector 4, the evaporated fuel processing device 20, the throttle valve 32, and the like and controls the same. The memory of the ECU 100 stores in advance values and data maps necessary for processing in the evaporated fuel processing device 20, such as a specifying process and the like. Specifically, details thereof will be described in descriptions regarding the respective processes later.

Next, an operation of the evaporated fuel processing device 20 will be described. When a purge condition is satisfied while the engine 2 is driving, the ECU 100 executes the purge process by controlling the control valve 26 on the duty basis. The purge condition is a condition that is satisfied in a case where the purge process to supply the purge gas to the engine 2 should be executed, and is a condition that is set to the ECU 100 in advance by a manufacturer according to a cooling water temperature for the engine 2 and a situation of specifying the purge concentration by the concentration detector 50. The ECU 100 is monitoring whether the purge condition is satisfied or not at all times during when the engine 2 is driving. The ECU 100 controls an output of the pump 25 and the duty ratio of the control valve 26 based on the purge concentration specified by the concentration detector 50. When the pump 25 is activated, the purge gas that has been adsorbed in the canister 19 and the air having passed the air cleaner 30 are introduced to the engine 2.

The ECU 100 controls the aperture of the throttle valve 32. Further, the ECU 100 also controls an injection fuel amount of the injector 4. Specifically, it controls the injection fuel amount by controlling a valve-opening time of the injector 4. When the engine 2 is driven, the ECU 100 calculates a fuel injection time (that is, the valve-opening time of the injector 4) per unit time period to be injected from the injector 4 to the engine 2. The fuel injection time is calculated by correcting a reference injection time that is specified in advance by experiments to maintain an air-fuel ratio to a target air-fuel ratio (such as an ideal air-fuel ratio). An air-fuel ratio sensor is disposed in a discharge passage of the engine 2. Further, the ECU 100 includes a counter that counts cycles of the control valve 26 during the purge process. The ECU 100 increments a value in the counter by 1 each time a cycle is started, where one cycle is defined by one switch of the control valve 26 between opened and closed states.

The ECU 100 specifies the purge concentration by a specifying process during when the purge process is executed. The specifying process will be described with reference to FIGS. 4 and 5. The specifying process is started when a vehicle is activated. During when the vehicle is operating, the process is periodically executed. Here, the activation of the vehicle means, in a case where a driving source of the vehicle is only the engine 2, that an ignition switch is operated by a driver, and the engine 2 is thereby started. On the other hand, in a case where the driving source of the vehicle includes the engine 2 and a motor, that is, in a case where the vehicle is a hybrid vehicle, it means that a start switch of the vehicle is operated by the driver and a control system of the vehicle is initiated.

Figure 5:
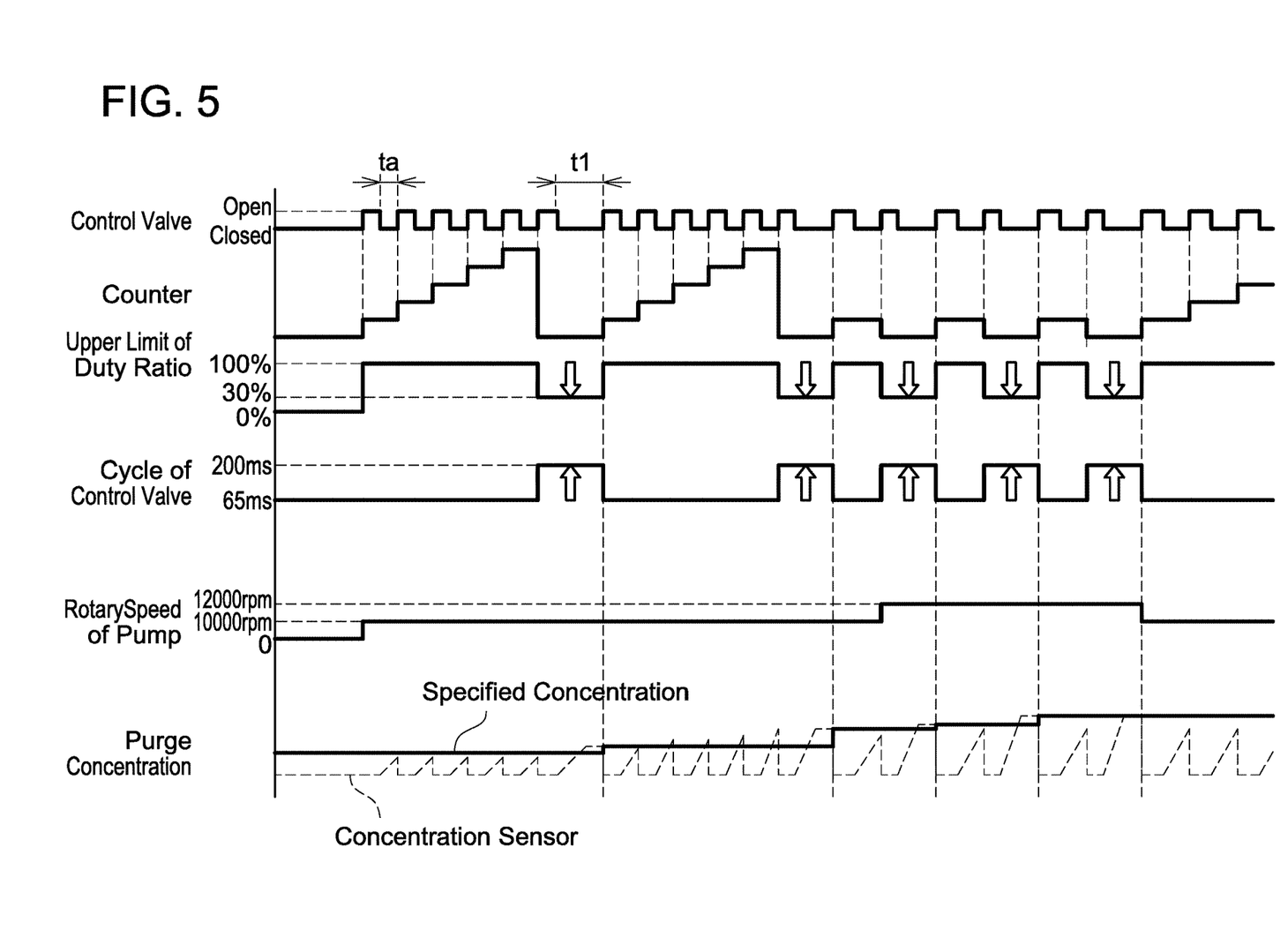
FIG. 5 shows a time chart showing opening and closing of a control valve and a change in a purge concentration in the specifying process according to the first embodiment.

FIG. 5 is a time chart showing the control of the control valve 26, an upper limit setting of the duty ratio of the control valve 26, the cycles of the control valve 26, the rotary speed of the pump 25, and a change in the specified concentration while the purge process is executed. A lowermost portion of FIG. 5 shows the purge concentration. The purge concentration shown by a one-dot chain line is the purge concentration acquired using the concentration detector 50, and the purge concentration shown by a solid line is the purge concentration specified in the specifying process and stored in the ECU 100. The ECU 100 uses the specified purge concentration as the purge concentration to execute control of the evaporated fuel processing device 20 and control of the fuel injection amount.

At a timing when the vehicle is activated, a purge execution flag is not set, the pump 25 is stopped, the ECU 100 does not store the concentration, and the control valve 26 is closed.

Figure 4:
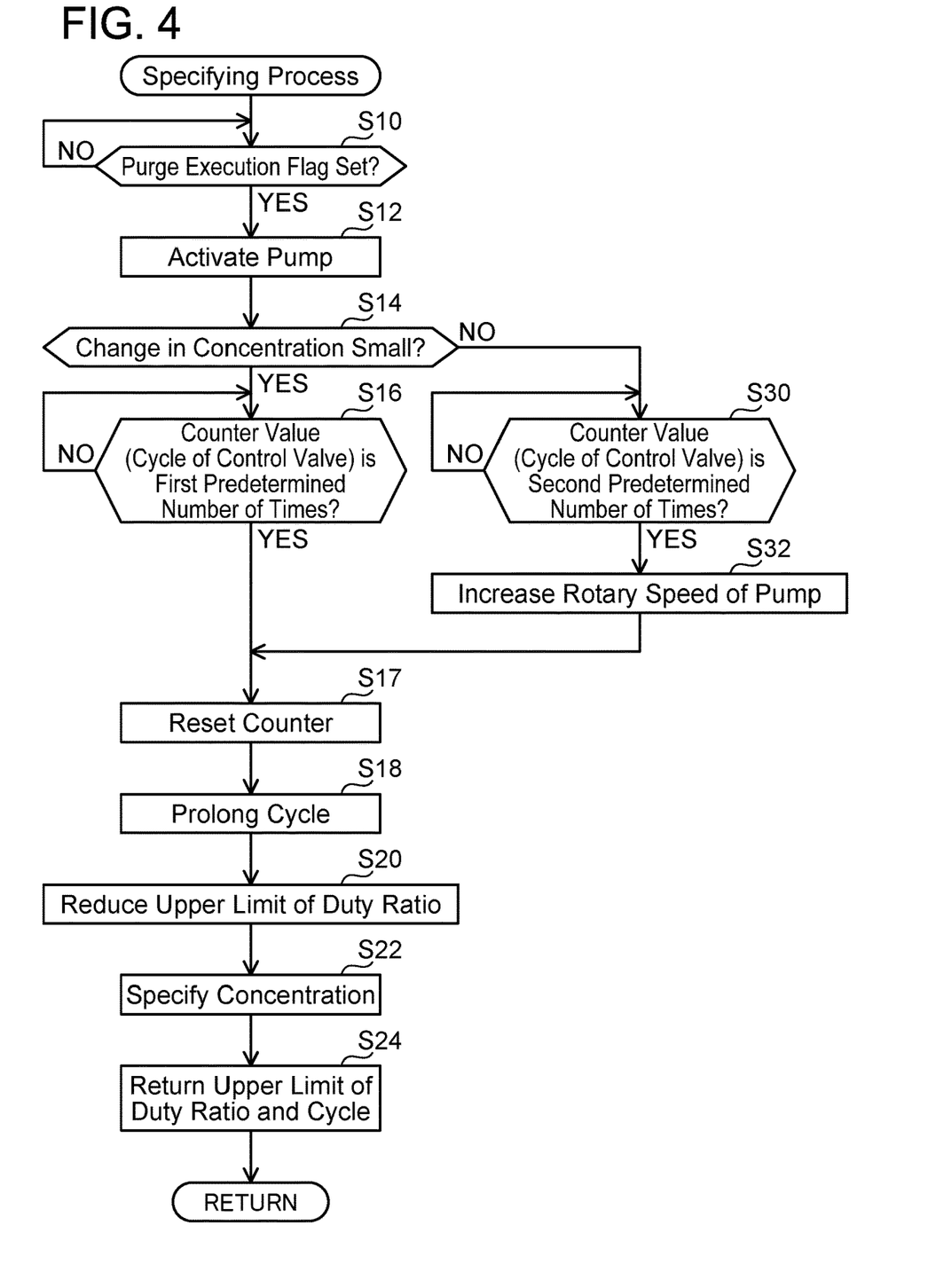
FIG. 4 shows a flowchart of a specifying process according to the first embodiment.

As shown in FIG. 4, in the specifying process, firstly in S10, the ECU 100 determines whether a purge execution flag is set or not. Specifically, the ECU 100 is executing a purge determination process for determining whether the purge condition is satisfied or not in parallel to the specifying process. In the purge determination process, the ECU 100 determines whether the purge condition is satisfied or not based on the cooling water temperature of the engine 2 and the detection result of the air-fuel ratio sensor. The purge condition is set in advance in the ECU 100 in accordance with properties of the vehicle and an environment in which the vehicle is used. For example, the ECU 100 determines that the purge condition is satisfied in a case where the cooling water temperature of the engine 2 is equal to or higher than a predetermined value and the detection result of the air-fuel ratio sensor is received. When determining that the purge condition is satisfied, the ECU 100 sets the purge execution flag in the memory.

In a case where the purge execution flag is not set (NO in S10), the process waits in S10 until the purge execution flag is set. On the other hand, in a case where the purge execution flag is set (YES in S10), that is, in a case where the purge process is being executed, the ECU 100 operates the pump 25 at a predetermined rotary speed (for example, 10000 rpm) in S12. In the purge process, the process of S12 is skipped if the pump 25 is already operating at the predetermined rotary speed.

Next, in S14, the ECU 100 determines whether or not the change in the purge concentration is small. Specifically, it determines whether or not a concentration difference between the purge concentration specified in the previous specifying process (i.e., the purge concentration specified in S22 in the previous specifying process) and the purge concentration specified in the specifying process immediately preceding the previous specifying process (i.e., the purge concentration specified in S22 in the specifying process immediately preceding the previous specifying process) is equal to or less than a predetermined value (such as 5%).

In a case where the concentration difference is equal to or less than the predetermined value, the ECU 100 determines that the change in the purge concentration is small (YES in S14) and proceeds to S16. On the other hand, in a case where the concentration difference is greater than the predetermined value, the ECU 100 determines that the change in the purge concentration is not small (NO in S14) and proceeds to S30. In S14, in a case where the purge concentrations from the previous specifying process and the specifying process immediately preceding the previous specifying process are not stored in the ECU 100, that is, in a case where the specifying process currently being executed is a first time or a second time specifying process since the vehicle was started, the ECU 100 determines YES in S14 and proceeds to S16.

In S16, the ECU 100 determines whether or not a timing to specify the purge concentration has arrived. Specifically, the ECU 100 determines whether or not the value of the counter (that is, a number of times the cycle of opening and closing of the control valve 26 has taken place) is a first predetermined number of times (such as five times). In a case where the value of the counter is the first predetermined number of times, the ECU 100 determines that the timing to specify the purge concentration has arrived (YES in S16), and proceeds to S17. In S17, the ECU 100 resets the value of the counter (that is, sets it to "0"), restarts the counting, and proceeds to S18. On the other hand, in a case where the value of the counter is less than the first predetermined number of times (NO in S16), the ECU 100 monitors the value of the counter in S16 until it reaches the first predetermined number of times. In the case of NO in S16, the ECU 100 controls the control valve 26 at a standard cycle (such as 65 milliseconds) in the purge process. The ECU 100 does not reset the counter, and increments the value of the counter by 1 at the timing when the control valve 26 is opened.

In S18, the ECU 100 switches the cycle of the control valve 26 from the standard cycle (such as 65 milliseconds) to an extended cycle (such as 200 milliseconds). Due to this, as shown in FIG. 5, a switching period for opening and closing of the control valve 26 per one time becomes longer. As a result, without changing the duty ratio, a period during which the control valve 26 is closed and the purge passage 24 is cut off (a period t1 in FIG. 5) becomes longer than a period during which the control valve 26 is closed in the standard cycle and the purge passage 24 is cut off (a period t0 in FIG. 5). Due to this, a period during which the purge gas flows through the return flow passage 52 can be prolonged.

Next, in S20, the ECU 100 reduces an upper limit of the duty ratio of the control valve 26 (that is, a ratio of a valve-opening period per cycle). For example, the ECU 100 reduces the upper limit of the duty ratio from 100% of a normal state to 30%. When the upper limit of the duty ratio is reduced, and the duty ratio (such as 80%) specified by the air-fuel ratio is greater than the set upper limit (such as 30%), the duty ratio is set so that it does not exceed the upper limit of the duty ratio (such as 30%). According to this configuration, a valve-closing period can be prevented from becoming short. Next, in S22, the purge concentration is specified using the concentration detector 50. Specifically, the ECU 100 uses the differential pressure detected by the differential pressure sensor 70 to specify the purge concentration. When the control valve 26 is closed, the purge gas starts to flow into the return flow passage 52. As a result, the purge gas flows through the venturi passage 72. When the control valve 26 is closed, the purge gas that flows through the venturi passage 72 gradually increases, and a flow rate thereof stabilizes after a while. As shown in FIG. 5, the ECU 100 uses the differential pressure detected by the differential pressure sensor 70 to specify the purge concentration, and when the specified purge concentration stabilizes (that is, the purge concentration after the flow rate (pressure) has been stabilized), the ECU 100 stores this purge concentration as the current purge concentration therein. Next, in S24, the ECU 100 returns the cycle of the control valve 26 and the upper limit of the duty ratio changed in S18, S20 to their original values, and returns to S10.

On the other hand, in S30, the ECU 100 determines whether or not a timing to specify the purge concentration has arrived. Specifically, the ECU 100 determines whether or not the value of the counter is a second predetermined number of times (such as one time). In a case where the value of the counter is the second predetermined number of times, the ECU 100 determines that the timing to specify the purge concentration has arrived (YES in S30), and proceeds to S32. On the other hand, in a case where the value of the counter is less than the second predetermined number of times (NO in S30), the ECU 100 continues monitoring in S30 until the counted number of times of the cycles reaches the second predetermined number of times. In the case of NO in S30, the ECU 100 controls the control valve 26 at the standard cycle in the purge process. The ECU 100 does not reset the counter, and increments the value of the counter by 1 at the timing when the control valve 26 is opened. In S32, the ECU 100 raises the rotary speed of the pump 25 to the predetermined value and proceeds to S17, and then the ECU 100 resets the count value and restarts the counting.

The second predetermined number of times is smaller than the first predetermined number of times used in S16. That is, a frequency for detecting the purge concentration becomes higher. According to this configuration, the detection frequency of the purge concentration can be increased when the change in the purge concentration is large. As a result, the purge concentration that dynamically changes can suitably be specified, and the fuel injection time can be determined thereby. Due to this, the air-fuel ratio can be prevented from being greatly deviated by the change in the purge concentration.

In S24 after S30 has been executed, the rotary speed of the pump 25 changed in S30 is returned to its original value, in addition to the values changed in S18, S20.

According to the specifying process as above, the purge concentration can be specified during the purge process. As a result, the fuel injection period and the duty ratio can suitably be controlled during the purge process. Due to this, the air-fuel ratio can be suppressed from being deviated. Especially upon specifying the concentration, the purge concentration can be specified using the differential pressure after the purge gas pressure has been stabilized at the concentration detector 50 by prolonging the valve-closing period of the control valve 26. Further, in the evaporated fuel processing device 20, the concentration detector 50 does not have to be disposed on the purge passages 23, 24, 28. Due to this, the pressure loss in the purge gas upon when the purge gas is supplied to the intake passage 34 can be suppressed.

Further, in the case where the change in the concentration is large (NO in S14), the rotary speed of the pump 25 is increased (S32), in addition to increasing the frequency to specify the concentration. According to this configuration, the purge gas can flow through the return flow passage 52 at an early timing. As a result, the concentration specified by the concentration detector 50 (that is, the pressure of the purge gas) can be stabilized at an early timing.

(Second Embodiment)

Figure 10:
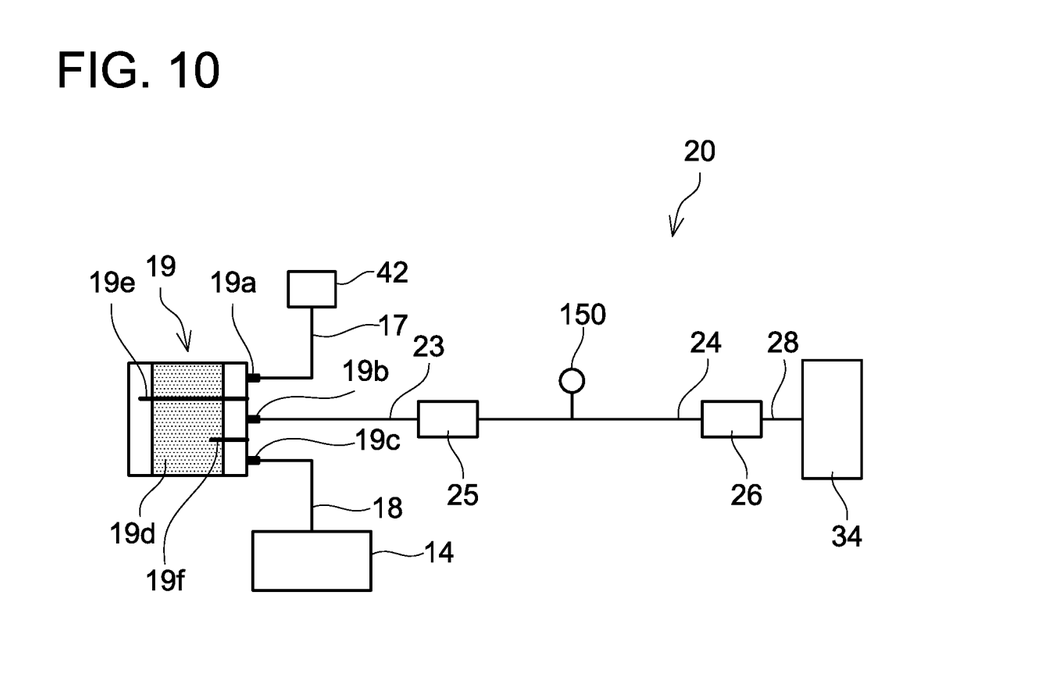
FIG. 10 shows an evaporated fuel processing device according to a second embodiment.

Features differing from those of the first embodiment will be described with reference to FIG. 10. The evaporated fuel processing device 20 of the present embodiment is not provided with the return flow passage 52. In other words, the purge passages 23, 24 are not branched. The evaporated fuel processing device 20 is provided with a pressure sensor 150 configured to detect a pressure in the purge passage 24 (that is, the purge passage 24 between the pump 25 and the control valve 26) instead of the concentration detector 50.

The ECU 100 of the evaporated fuel processing device 20 specifies the purge concentration by using the pressure of the purge gas in the purge passage detected by the pressure sensor 150 in S22 of FIG. 4 of the specifying process.

When the purge concentration changes, the density of the purge gas changes in correlation to the purge concentration. Even when the pump 25 is driven at the predetermined rotary speed, the increase in the pressure of the purge gas caused by the pump 25 varies depending on the density of the purge gas (that is, the purge concentration). The ECU 100 calculates a difference (that is, how much the pressure of the purge gas has been increased by the pump 25) between the pressure detected by the pressure sensor 150 and atmospheric pressure (that is, a pressure on an upstream side of the pump 25). The ECU 100 stores a data map indicating a relationship between a pressure difference between upstream and downstream sides of the pump 25 (that is, the pressure increase by the pump 25) specified in advance by experiments and the purge concentration. The ECU 100 uses the calculated pressure difference and the data map to specify the purge concentration. The evaporated fuel processing device 20 may be provided with an atmospheric pressure sensor, may acquire the atmospheric pressure from an atmospheric pressure sensor that is externally provided, or may have the atmospheric pressure (fixed value) stored in the ECU 100 in advance.

According to this configuration, the venturi passage 72 and the return flow passage 52 do not need to be provided.

While specific examples of the present invention have been described above in detail, these examples are merely illustrative and place no limitation on the scope of the patent claims. The technology described in the patent claims also encompasses various changes and modifications to the specific examples described above.

Figure 6:
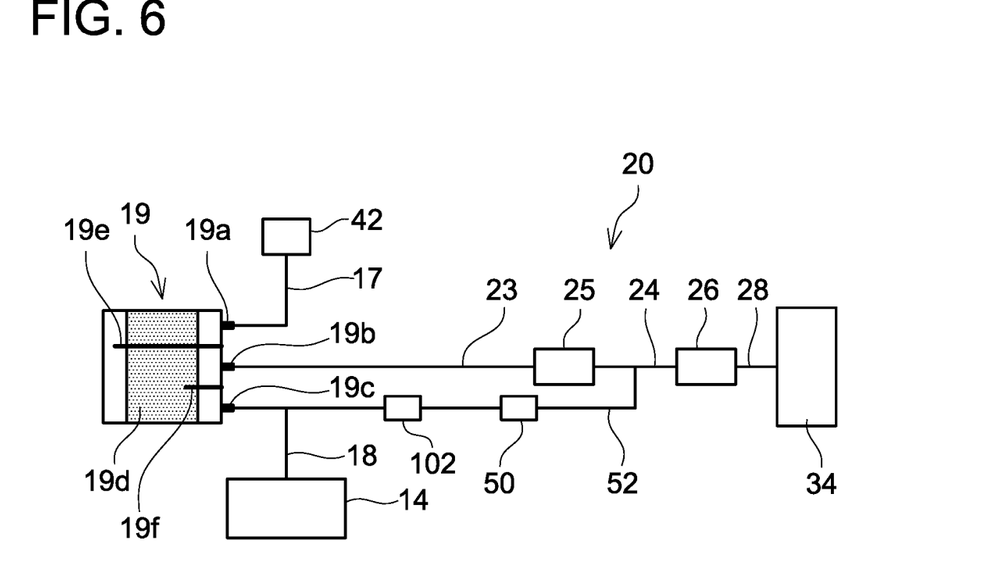
FIG. 6 shows an evaporated fuel processing device according to a variant.

For example, the configuration of the evaporated fuel processing device 20 is not limited to the configuration shown in FIG. 2. For example, as shown in FIG. 6, the downstream end of the return flow passage 52 may be connected to the communicating passage 18. In this case, a check valve 102 may be disposed on the return flow passage 52 on a communicating passage 18 side than the concentration detector 50. The check valve 102 may allow a flow from the concentration detector 50 to the communicating passage 18 side, while prohibiting a flow from the communicating passage 18 to the concentration detector 50.

Figure 7:
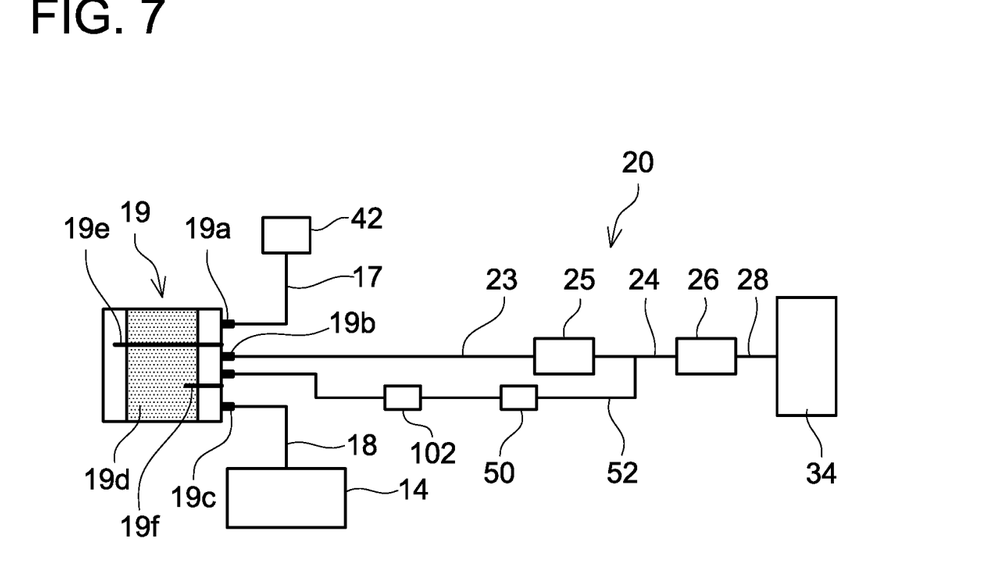
FIG. 7 shows an evaporated fuel processing device according to a variant.

Alternatively, as shown in FIG. 7, the downstream end of the return flow passage 52 may be connected directly to the canister 19.

Figure 8:
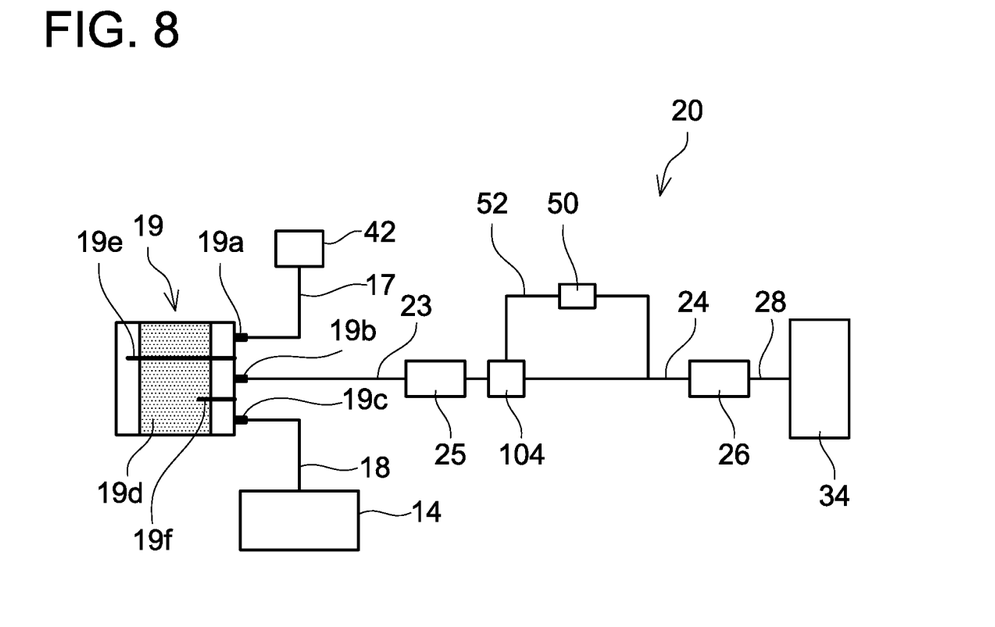
FIG. 8 shows an evaporated fuel processing device according to a variant.

Further, as shown in FIG. 8, the both ends of the return flow passage 52 may be connected to the purge passage 24 on a control valve 26 side than the pump 25. In this case, a three-way valve 104 may be disposed at a connection between the end of the return flow passage 52 on a pump 25 side and the purge passage 24. The three-way valve 104 may switch between a purging state in which communication between the purge passage 24 and the return flow passage 52 is cut off and the purge passage 24 is communicated, and a concentration specifying state in which the purge passage 24 and the return flow passage 52 are communicated and the purge passage 24 is cut off. The three-way valve 104 may be maintained in the purging state at a timing when the specifying process is started. The ECU 100 may switch the three-way valve 104 from the purging state to the concentration specifying state in S22, and may switch the three-way valve 104 from the concentration specifying state to the purging state in S24.

Figure 9:
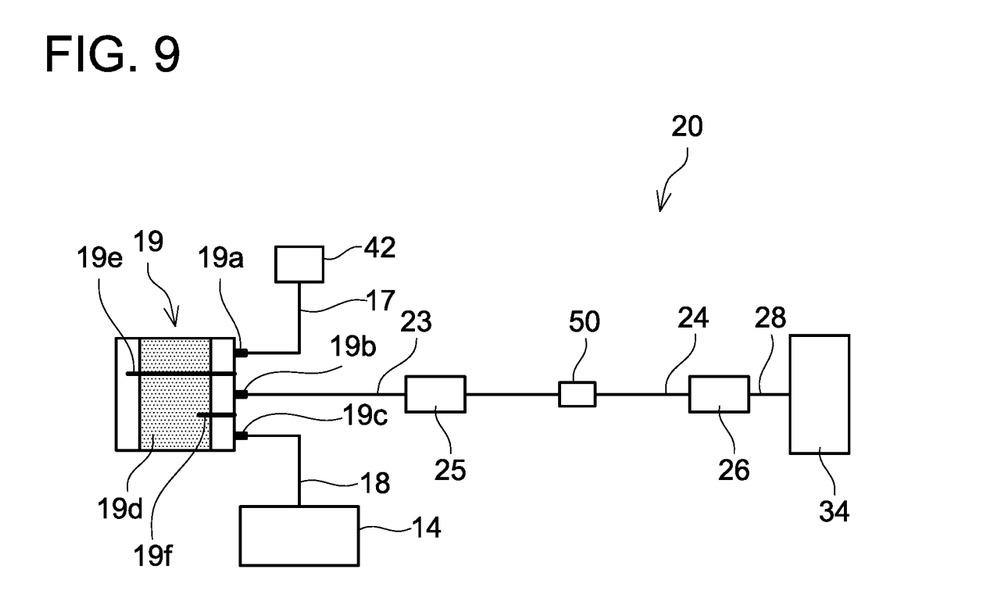
FIG. 9 shows an evaporated fuel processing device according to a variant.

Further, as shown in FIG. 9, the return flow passage 52 may not be provided. In this case, the concentration detector 50 may dispose the venturi passage 72 on the purge passage 24.

Further, in the specifying process, the ECU 100 may not execute at least one of S18 (that is, the extension of the cycle of the duty ratio for specifying the concentration) and S20 (that is, the reduction of the upper limit of the duty ratio for specifying the concentration). Further, in the specifying process, the ECU 100 may not execute S14, S30, and S32 (that is, the processes for changing the rotary speed of the pump and the concentration specifying frequency in accordance with the change in the concentration).

Further, in the specifying process, the ECU 100 may execute the duty control of the control valve 26 in the standard cycle, in accordance with the change in the purge concentration, by one of a plurality of extended cycles including a first extended cycle and a second extended cycle which is longer than the first extended cycle. In this case, the extended cycle with a longer period may be selected as the change in the purge concentration becomes larger.

Further, in S22 of the specifying process, the ECU 100 may specify the purge concentration by using a peak value or a maximum value of the pressure detected by the differential pressure sensor 70.

Moreover, in the specifying process, the concentration is specified once every first predetermined number of times. However, as the timing to specify the concentration, for example, the concentration may be specified once or more within the first predetermined number of times.

In the above embodiments, the differential pressure sensor 70 that specifies the differential pressure is used as the concentration detector 50. However, the concentration detector 50 may be provided with a sonic concentration meter. The sonic concentration meter may have a cylindrical shape disposed on the return flow passage 52, and may specify the concentration of the purge gas (that is, a molecular weight of the purge gas) by sending and receiving signals into and from the cylindrical shape.

The technical elements explained in the present description or drawings provide technical utility either independently or through various combinations. The present invention is not limited to the combinations described at the time the claims are filed. Further, the purpose of the examples illustrated by the present description or drawings is to satisfy multiple objectives simultaneously, and satisfying any one of those objectives gives technical utility to the present invention.

REFERENCE SIGNS LIST

2: Engine
6: Fuel Supply System
10: Main Supply Passage
19: Canister
20: Evaporated Fuel Processing Device
22: Purge Supply Passage
23: Purge Passage
24: Purge passage
25: Pump
26: Control Valve
28: Purge Passage
30: Air Cleaner
32: Throttle Valve
34: Intake Passage
42: Air Filter
50: Concentration Detector 52: Return Flow Passage
70: Differential Pressure Sensor
72: Venturi Passage
100: ECU
102: Check Valve
104: Three-way Valve

The invention claimed is:

1. An evaporated fuel processing device mounted on a vehicle, the evaporated fuel processing device comprising:
   a canister configured to adsorb evaporated fuel in a fuel tank;
   a purge passage connected between an intake passage for an engine and the canister, and through which purge gas sent from the canister to the intake passage passes;
   a pump disposed on the purge passage between the canister and the intake passage, and configured to send the purge gas from the canister to the intake passage;
   a control valve disposed on the purge passage and configured to switch between a communication state and a cutoff state, the communication state being a state where the canister and the intake passage communicate through the purge passage, and the cutoff state being a state where the canister and the intake passage are not communicated on the purge passage;
   a controller configured to execute duty control to switch the control valve between the communication state and the cutoff state based on a duty ratio in a case where the purge gas is to be supplied from the canister to the intake passage; and
   a specifying device configured to specify an evaporated fuel concentration of the purge gas in the purge passage;
   wherein
   the controller switches the control valve based on plural kinds of cycles in the duty control,
   the plural kinds of cycles include a first cycle and a second cycle which is longer than the first cycle, and
   the specifying device specifies the evaporated fuel concentration of the purge gas in the purge passage while the pump is active and the control valve is in the cutoff state in the second cycle during the duty control.

2. The evaporated fuel processing device as in claim 1, wherein
   a maximum ratio of a period of the communication state in the second cycle is less than a maximum ratio of a period of the communication state in the first cycle.

3. The evaporated fuel processing device as in claim 1, wherein
   the controller is configured to switch the control valve in the second cycle that takes place for one time after the first cycle takes place for a predetermined number of times consecutively, the predetermined number being two or more.

4. The evaporated fuel processing device as in claim 3, wherein
   the controller is configured to change the predetermined number of times for the first cycle according to the evaporated fuel concentration.

5. The evaporated fuel processing device as in claim 1, wherein
   the controller is configured to change a rotary speed of the pump according to the evaporated fuel concentration while the control valve is controlled in the second cycle.

6. The evaporated fuel processing device as in claim 1, wherein
   the specifying device comprises:
      a narrowed portion disposed on the purge passage and having a flow passage area smaller than a flow passage area of the purge passage; and
      a pressure detecting unit configured to detect a pressure of the purge gas flowing in the narrowed portion,
   wherein the specifying device is configured to specify the evaporated fuel concentration using the pressure detected by the pressure detecting unit.

7. The evaporated fuel processing device as in claim 1, wherein
   the purge passage comprises a return flow passage,
   one end of the return flow passage is connected to the purge passage between the pump and the control valve,
   another end of the return flow passage is connected to the purge passage on an upstream side relative to the pump,
   the purge gas enters the return flow passage from the one end and flows toward the other end of the return flow passage in a case where the control valve is in the cutoff state and the pump is active, and
   the specifying device is disposed on the return flow passage and configured to specify the evaporated fuel concentration of the purge gas within the return flow passage while the pump is active and the control valve is in the cutoff state in the second cycle during the duty control.

8. The evaporated fuel processing device as in claim 1, wherein
   the specifying device comprises a pressure detecting unit configured to detect a pressure in the purge passage, and
   the specifying device is configured to specify the evaporated fuel concentration using the pressure in the purge passage detected by the pressure detecting unit.

* * * * *